United States Patent [11] 3,626,137

[72] Inventors Robert Bernard Bertolasi;
 Douglas Martin Hood; Walter Avery Strange, all of Rockford, Ill.
[21] Appl. No. 22,591
[22] Filed Mar. 25, 1970
[45] Patented Dec. 7, 1971
[73] Assignee Amsted Industries Incorporated
 Chicago, Ill.

[54] METHOD OF ELECTRICAL DISCHARGE MACHINING
 11 Claims, 2 Drawing Figs.

[52] U.S. Cl. .................................................. 219/69 D
[51] Int. Cl. .................................................. B23p 1/08
[50] Field of Search ...................................... 219/69 M, 69 D

[56] References Cited
 UNITED STATES PATENTS
 3,346,713 10/1967 Blatt et al. ..................... 219/69 D Primary Examiner—J. V. Truhe
Assistant Examiner—J. G. Smith
Attorneys—Walter L. Schlegel, Jr. and John W. Yakimow ABSTRACT: In electrical discharge machining, material is eroded away from a workpiece by electrical discharges occurring between an electrode and the workpiece. Coolant, that will change from a liquid to a gaseous state at a temperature and pressure below the temperature and pressure around the workpiece, is introduced in its liquid state into the gap between the electrode and the workpiece at the same time electrical discharges are passed across said gap. The liquid coolant experiences a temperature increase and a pressure decrease in the gap and flashes into its gaseous state thereby increasing in volume. Such volumetric increase results in a rapid gas flow away from the gap into the area around the workpiece that removes eroded particles. The change of state from a liquid to a gas is also accompanied by a decrease in temperature of the surrounding area including the electrode and the workpiece.

Inventors:
Robert B. Bertolasi,
Douglas Martin Hood,
Walter Avery Strange

By John W. Yakimow

METHOD OF ELECTRICAL DISCHARGE MACHINING

BACKGROUND OF THE INVENTION

In electrical discharge machining, an electrode and workpiece to be machined are spaced to form a gap. The electrode and workpiece are associated with an electrical control circuit including a source of electrical energy for producing electrical discharges or arcs across the gap to remove metal from the workpiece in a predetermined configuration. The gap is generally occupied by a relatively stable liquid such as dielectric oil. The electrical arcs pass through the liquid and erode the metal from the workpiece.

The liquid is generally pumped through or around the electrode and provides an ionized path during arcing and dielectric strength between arcs. The liquid further aids in the removal of eroded particles from the workpiece. A certain degree of cooling of the electrode and the workpiece is also provided by the liquid.

In eroding small holes (less than 0.100 of an inch in diameter), the degree of particle removal and the cooling efficiency of the liquid is substantially reduced resulting in increased destruction of the electrode and prolonged short circuits of the electrical discharges. It is believed that these short circuits result in a melting and recasting of the electrode or the workpiece which creates a ragged opening. As the depth of the small hole increases, the above referred to problems also increase until a point is reached where further erosion is economically impractical.

BRIEF DESCRIPTION OF THE INVENTION

Pressurized liquid refrigerant such as dichlorodifluoromethane is forced through a passage in an electrode. The passage opens into a gap between the electrode and a workpiece. As the liquid refrigerant passes through the opening into the gap during electrical erosion of the workpiece, it experiences a change of state to a gas. This change is caused by a decrease in pressure and an increase in temperature of the liquid. Such liquid to gas change is accompanied by a decrease in temperature proximate said opening and in said gap which is expended in heat removal from the electrode and the workpiece reducing the number and length of the short circuits, loss of electrode material and the amount of electrode workpiece welding. The rapid expansion of the liquid to a gas and a corresponding reduction of density is further accompanied by a high-volumetric gas flow which carries away eroded particles.

DETAILED DESCRIPTION OF THE INVENTION

Figure 1:
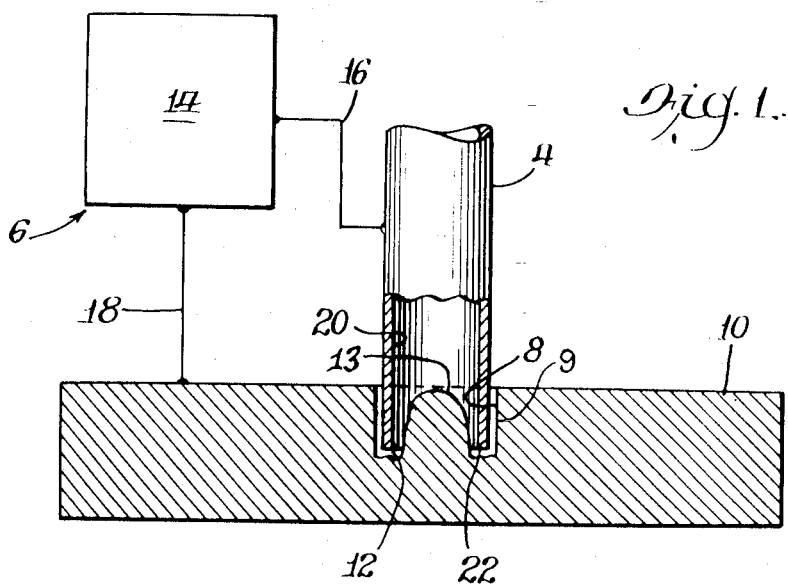
FIG. 1 is an enlarged, simplified, fragmentary elevational view, partly in section, illustrating the interrelationship of an electrode and a workpiece.

In FIG. 1, an electrode 4 of a known electrical discharge machine 6 is schematically illustrated in a hole 8 partially defined by an outer wall 9. The hole 9 has been eroded away in an electrically conductive workpiece 10. The material of the workpiece, in electrical discharge machining, is removed by a series of intermittent electrical discharges that cross a gap 12 between the electrode 4 and the workpiece 10. Since most of the discharges occur at the lower end of electrode 4, a core 13, which is part of workpiece 10, remains in hole 8 and projects upwardly into passage 20 of electrode 4.

The electrical discharges are created and controlled by a power supply unit 14 which is respectively connected to electrode 4 and workpiece 10 by electrical conductors 16 and 18. The distance across gap 12 may be controlled by a motor arrangement (not shown) that raises and lowers electrode 4.

The electrode 4, which may be made of tungsten, copper, brass or other electrical conductive materials, is provided with a passage 20. A refrigerant-type coolant, such as dichlorodifluoromethane is forced under pressure in its liquid state through passage 20 around core 13 and out of the opening 22 into the gap 12 immediately prior to and during the electrical discharge machining of workpiece 10. During machining, the pressure and temperature between core 13 and electrode 4, at gap 12 and between the wall 9 and electrode 4, is respectively below and above the pressure and temperature needed to change the liquid coolant to a gas. Ambient conditions of pressure and temperature around electrode 4 outside of hole 8 are also, respectively, below and above the pressure and temperature needed to change the liquid coolant to a gas.

As the coolant changes to a gas, a rapid change of density occurs thereby greatly increasing the volume of the coolant. The ratio of the density of the coolant in a liquid state to its density in a gaseous state is preferably of a magnitude equal to or greater than 100 to 1. Smaller ratio are also acceptable.

In a typical operation, the electrode 4 may have an outside diameter of 0.012 inches and the eroded hole 8 may be 0.013 to 0.014 inches in diameter. As the volume of the coolant increases, a high-volumetric gas flow is created around the conical-shaped core 13 through gap 12 and between wall 9 and electrode 4. This gas flow carries eroded particles away from the area from which they were removed. As the particles are removed, gap 12 increases and the electrode 4 is accordingly lowered in a known matter into the eroded hole 8. The process of erosion of particles, particle removal and electrode lowering is continued until the hole passes through workpiece 10 or the desired depth is reached.

The rapid expansion of the liquid to a gas is further accompanied by a decrease in temperature proximate core 13, gap 12 and wall 9. The temperature decrease is expended in removing heat from electrode 4 and workpiece 10. The high-volumetric gas flow through this area is a further aid to cooling. The gas absorbs some of the heat of the electrode 4 and workpiece 10 causing further expansion and increased gas flow accompanied by increased particle and heat removal.

The given coolant should further have a high-dielectric strength in both its liquid and gaseous state. Good thermal stability and compatibility with the conductive workpiece is also desirable.

The following examples further illustrate the advantages of this invention, but are not intended to limit the scope thereof.

EXAMPLE I

A copper electrode 0.012 inches in diameter was used in an electrical discharge machine to erode a hole through a Nickel base material having the following composition:

| | |
|---|---|
| Nickel | 61% |
| Chrome | 9% |
| Cobalt | 10% |
| Titanium | 2% |
| Aluminum | 5% |
| Tungsten | 13% |

A commercial coolant, known as Quick Freeze MS-240 (a mixture by weight of approximately 49 percent monochlorodifluoromethane and 51 percent monochoropentafluoroethane) was forced in its liquid state through a passage in the electrode at can pressure. The generated frequency of power supply unit 14 was approximately 200,000 cycles per second. The frequency at gap 12 was approximately 60,000 to 100,000 cycles per second and the measured capacitance of the gap was approximately 0.03 farad. The electrode eroded a hole approximately 0.013 inches in diameter through a 0.1-inch-thick workpiece in 1.12 minutes.

EXAMPLE II

Carbon dioxide at 800 pounds per square inch gauge pressure was used as a coolant instead of Quick Freeze MS-240.

The composition of the workpiece and all other figures except eroding time were similar to those set out in example I. The electrode eroded a hole approximately 0.013 inches in diameter through a 0.1-inch-thick workpiece in 8 minutes.

EXAMPLE III

Freon 12, dichlorodifluoromethane, was used from a can and fed in its liquid state under can pressure into the passage in the electrode. The thickness of the workpiece was 0.250 inches. All other factors except eroding time were similar to those set out in example I. The electrode eroded a hole approximately 0.013 inches in diameter through a 0.250-inch-thick workpiece in 1.2 minutes.

The tests in examples I, II and III were at atmospheric pressure and room temperature, i.e., approximately 14.7 pounds per square inch absolute and 75° F. Straight cuts (electrode normal to the surface of the workpiece as illustrated by FIG. 1) were made on each workpiece. The coolant in all cases entered the passage in the electrode in a liquid state. Variation in the starting of coolant flow either prior to or after the electrical discharges had begun had little effect on the erosion process as long as the coolant was flowing through the electrode.

In examples I and III respectively, 0.175 and 0.040 inches of material was burned off of the end of each electrode. Corresponding material loss for example II was somewhat greater.

Water, dielectric oils and degreasers were also tested at the above referred to room temperature and pressure. The electrode with these liquids would not cut through the workpieces referred to above. It should be noted that all coolants that were tested and that successfully aided the erosion of a small hole through a workpiece, would boil, i.e., completely change from a liquid to a gas, at a temperature and pressure below the temperature and pressure at the point of the electrical discharges. It was also noted that it was necessary to have the pressure and temperature conditions around the workpiece 10 in the area of hole 8 at respective states of pounds per square inch absolute and degrees Fahrenheit at which the coolant could only be maintained in a gaseous state. Appropriate coolants should be chosen with these factors in mind. It is furthermore desirable, but not mandatory, that the coolant boil at a temperature equal to or less than 0° F. to aid in cooling the electrode and the workpiece.

Although the tests were primarily performed in eroding small holes (less than 0.100 of an inch in diameter), the results are equally applicable for large electrical discharge erosion applications. Other acceptance coolants for electrical discharge machining at a temperature of about 70° F. and a pressure of about 14.7 pounds per square inch absolute may be chosen from the group of compounds commonly referred to as "Refrigerants." This group includes: bromotrifluoromethane; a mixture by weight of 73.8 percent dichlorodifluoromethane and 26.2 percent ethylidene fluoride; monochlorotrifluoromethane; tetrafluoromethane; other halogenated hydrocarbons containing one or more fluorine atoms; and sulfur dioxide, as well as those compounds previously referred to. Trichloromonofluoromethane, as well as other substances, may be used where the ambient temperature is over 100° F. The chosen coolant should preferably be nonflammable in the gap area and should further be nonreactive with the workpiece.

Figure 2:
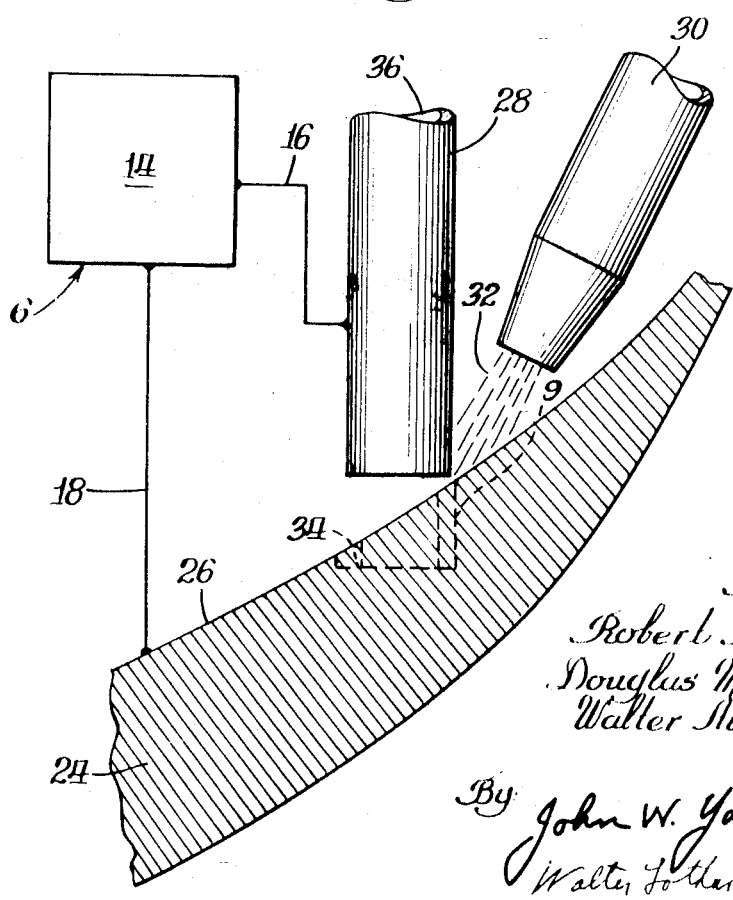
FIG. 2 is an enlarged, simplified, elevational view, partly in section, illustrating an electrode entering an angular surface of a workpiece.

FIG. 2 illustrates an arrangement for electrically eroding a hole in a workpiece 24 having an outer surface 26 that is angular (other than 90°) to the electrode 28. The electrode 28 is moved into an eroding position as shown and activated by power supply 14. A hollow feeder tube or nozzle 30 sprays a known liquid 32, such as dielectric oil, at the electrode 28 and workpiece 24 to remove eroded particles away from the gap and cool the electrode and workpiece.

The known liquid and electrical erosion is continued until a hole 34 indicated by the dashed lines is formed in workpiece 24. Thereafter the known liquid flow through feeder tube 30 is shut off and coolant similar that used in examples I, II or III is fed through a passage 36 in electrode 28. Electrical erosion and coolant flow through passage 36 is continued until a hole having the desired depth is achieved.

The added known liquid through the initial electrical eroding stage solves a cutting problem that exists in angular erosion if coolants such as dichlorodifluoromethane are initially forced through passage 36. Such coolant flow through passage 36 has a tendency at the beginning of the erosion to force the electrode out of its desired position. Once hole 34 is sealed, i.e., when a wall 9 is formed completely around electrode 28, this tendency is eliminated and liquid coolant may be forced through passage 36.

It should be noted that at a point proximate the depth of hole 34 further cutting of small holes (less than 0.100 of an inch in diameter) in many materials becomes economically impractical with the known liquid flow through nozzle 30. The placement of the feeder tube 30 and the liquid flow therethrough will vary with the rigidity of electrode 28 and the angle of surface 26. A high-liquid flow or unfavorable angle of flow can bend electrode 28 and thereby create guide problems. In cutting certain materials, a coolant similar to one of those described in examples I, II and III may be required to be fed through feeder tube 30 during initial electrical erosion.

What is claimed is:

1. A method of electrical discharge machining of an electrically conductive workpiece comprising the steps of locating an electrode adjacent said workpiece to form a gap between the electrode and the workpiece, and then passing a series of electrical discharges between said electrode and said workpiece across said gap while simultaneously changing a liquid dielectric coolant completely into a gas in the area of said electrical discharges and maintaining the pressure and temperature of the environment around the electrode and the workpiece at respective pounds per square inch and degrees Fahrenheit at which the dielectric can only exist in a gaseous state.

2. The method of claim 1 including the step of choosing a dielectric which is nonflammable and which volumetrically expands over one hundred times in changing from a liquid to gas.

3. The method of claim 1 including the step of choosing a dielectric which is a halogenated hydrocarbon containing one or more fluorine atoms.

4. The method of claim 3 wherein said liquid dielectric turns to a gas at a temperature below 0° F. and a pressure below 15 pounds per square inch absolute.

5. A method of electrical discharge machining comprising the steps of locating an electrode having a passage therethrough adjacent a conductive workpiece to form a gap therebetween at the opening of said passage, and then passing a series of electrical discharges between said electrode and said conductive workpiece across said gap while simultaneously feeding a dielectric in its liquid state through said passage toward the area of the gap and maintaining the temperature and pressure of the environment in the area of the electrode and the workpiece at respective states of degrees Fahrenheit and pounds per square inch at which the dielectric can only exist in its gaseous state.

6. The method of claim 5 including the step of choosing a dielectric which changes from its liquid state to its gaseous state at a pressure below 15 pounds per square inch absolute and at a temperature below 100° F.

7. The method of claim 6 wherein the density of said dielectric in its liquid state is at least one hundred times greater than the density of said dielectric in its gaseous state.

8. The method of claim 7 wherein aid dielectric is completely changed to its gaseous state prior to leaving said gap.

9. A method of electrical discharge machining comprising the steps of locating a electrode and an electrically conductive workpiece in space relationship to form a gap therebetween, then passing a series of electrical discharges across said gap between said electrode and said conductive workpiece to separate particles from said workpiece while simultaneously flowing a liquid dielectric fluid through and around said gap to remove said particles from said gap, and then stopping said flow of said liquid dielectric fluid to said gap and then expanding a liquid dielectric coolant to a gas in the area of said gap to remove said separated particles from said gap and cool said electrode and said conductive workpiece.

10. The method of claim 9 wherein said dielectric coolant is fed in its liquid state through a passage in aid electrode that opens into said gap, and said pressure of said dielectric coolant is rapidly reduced and said temperature of said dielectric coolant is rapidly increased in said passage proximate said gap to completely change said dielectric coolant from a liquid to a gas.

11. The method of claim 10 wherein the pressure and the temperature around said electrode and workpiece is at respective states of pounds per square inch and degrees Fahrenheit at which the dielectric coolant can only be maintained in a gaseous state.

* * * * *